(12) United States Patent
Ruutu et al.

(10) Patent No.: US 7,283,536 B2
(45) Date of Patent: Oct. 16, 2007

(54) MULTIMODE QUEUING SYSTEM FOR DIFFSERV ROUTERS

(75) Inventors: Jussi Ruutu, Espoo (FI); Kalevi Kilkki, Espoo (FI)

(73) Assignee: Nokia Corporation, Espoo (FI)

( * ) Notice: Subject to any disclaimer, the term of this patent is extended or adjusted under 35 U.S.C. 154(b) by 962 days.

(21) Appl. No.: 10/167,769

(22) Filed: Jun. 11, 2002

(65) Prior Publication Data

US 2003/0227876 A1    Dec. 11, 2003

(51) Int. Cl.
*H04L 12/56* (2006.01)
(52) U.S. Cl. .................. 370/400; 370/412; 370/395.4
(58) Field of Classification Search ............... 370/400, 370/412, 468, 429, 230, 235, 395.4, 395.42
See application file for complete search history.

(56) References Cited

U.S. PATENT DOCUMENTS

| | | | | |
|---|---|---|---|---|
| 6,047,326 | A | 4/2000 | Kilkki | 709/228 |
| 6,081,505 | A | 6/2000 | Kilkki | 370/230 |
| 6,944,128 | B2 * | 9/2005 | Nichols | 370/235 |
| 6,990,113 | B1 * | 1/2006 | Wang et al. | 370/412 |
| 2001/0051992 | A1 | 12/2001 | Yang et al. | |
| 2002/0191622 | A1 * | 12/2002 | Zdan | 370/401 |
| 2003/0007453 | A1 * | 1/2003 | Ogier et al. | 370/229 |
| 2003/0214954 | A1 * | 11/2003 | Oldak et al. | 370/400 |

OTHER PUBLICATIONS

M. Fine et al., "Differentiated Services Quality of Service Policy Information Base", *Internet Engineering Task Force Diffserv Working Group*, pp. 1-68, Jun. 2002.
Kalevi Kilkki, "Differentiated Services for the Internet", *Macmillan Technical Publishing*, 1999.
"Quality of Service (QoS) Concept and Architecture" *3GPP Technical Specification 23.107*, V5.6.0, pp. 1-40, Sep. 2002.
Ruutu, J. et al. "Simple Integrated Media Access - A Comprehensive Service for Future Internet," Performance of Information and Communication Systems, 1998, 11 pgs.

* cited by examiner

*Primary Examiner*—Doris H. To
*Assistant Examiner*—Feben Micael Haile
(74) *Attorney, Agent, or Firm*—Darby & Darby P.C.; M. David Ream

(57) ABSTRACT

A multimode queuing system for DiffServ routers is provided. The multimode buffering and scheduling system that can be adjusted to show either "pure" AF/EF behavior, "pure" DSUI behavior, or a combination of the AF/EF behavior and the DSUI behavior. An operation point parameter may be set to select the desired behavior. DiffServ products utilizing the combination of the behaviors are flexible and more configurable as compared to only AF/EF products. The multimode queuing system deployment is simple and is a low cost modification to DiffServ routers. The same hardware and/or software implementation can support both mechanisms with very small additional cost and effort. Also the management of the system is simplified. For example, there is no need for several parallel queuing systems.

21 Claims, 7 Drawing Sheets

MULTIMODE QUEUING SYSTEM FOR DIFFSERV ROUTERS

FIELD OF THE INVENTION

The present invention relates to IP networks, and more particularly to a multimode queuing system for DiffServ routers.

BACKGROUND OF THE INVENTION

The development of mobile communication devices and mobile networks has advanced at a rapid rate. At first, analog mobile networks enabled voice communication and simple paging features. Later, digital mobile networks provided more advanced features for voice and data communication, such as encryption, caller identification and short message service (SMS) text messages. More recently, third generation (3G) mobile IP network technology is being developed to enable users to easily access content rich media, information and entertainment with mobile devices.

As mobile devices and mobile networks have advanced, and more data has become available to the users, service providers have started offering different levels of service to their users based on need. For example, a business may need a higher level of service for a financial transaction than an individual subscriber may need to play a game. These differentiated service (DiffServ) classes can also help service providers utilize the available bandwidth more efficiently. Additionally, the service classes enable a service provider to help set a minimum level of quality-of-service (QoS) for their users.

In order to realize the service classes, network equipment typically needs to deploy queuing systems in front of links and other resources with limited capacity. The problem arises since current standards related to Differentiated Services allow quite a wide range of individual implementations of service differentiation. In addition, network operators may choose to use even the same network equipment in quite many different ways to support their own view of service differentiation. This may easily lead to a problem that network equipment vendors need to develop different implementations of queuing systems for supporting different ways to use service differentiation. Obviously, there is a need for solutions that allow wide range of different service differentiation schemes to be deployed with the same implementation in a configurable way.

SUMMARY OF THE INVENTION

The present invention is directed at addressing the above-mentioned shortcomings, disadvantages and problems, and will be understood by reading and studying the following specification.

According to one aspect of the invention, a multimode queuing system for DiffServ routers complies with the Assured Forwarding (AF)/Expedited Forwarding (EF) framework and also complies with the DiffServ Urgency Importance (DSUI) framework.

According to another aspect of the invention, the multimode queuing system is directed at providing a way to implement either the AF/EF kind of behaviour, the DSUI kind of behaviour, or a combination of the behaviours at the same time with one single queuing and scheduling implementation.

According to yet another aspect of the invention, a few simple parameters are configured to allow the DiffServ router to work as AF or DSUI or some smooth combination of those two behaviors. DiffServ products utilizing the combination of the behaviors are flexible and more configurable as compared to only AF/EF products. The operator may easily select the operation point parameter controlling the behavior of the router.

According to yet another aspect of the invention, the multimode queuing system deployment is simple and is a low cost modification to AF/EF behavior DiffServ routers. The same hardware and/or software implementation can support both mechanisms with very small additional cost and effort. Also the management of the system is simplified. For example, there is no need for several parallel queuing systems (e.g. one for AF, one for DSUI).

DETAILED DESCRIPTION OF THE PREFERRED EMBODIMENT

Figure 1:
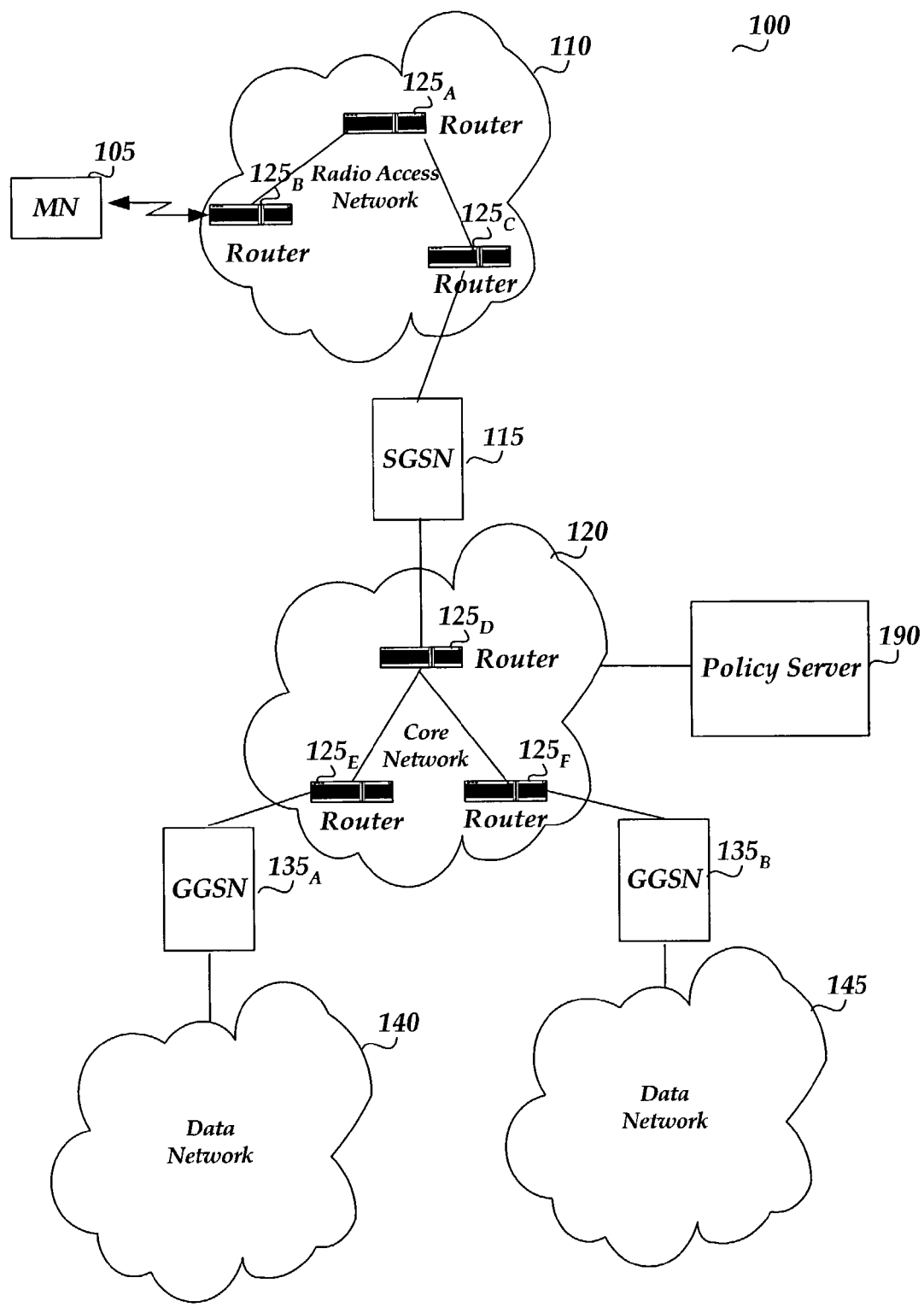
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term "importance" refers to a priority associated with a packet in terms of packet drop. The term "urgency" refers to the packet transfer delay priority. The term "flow" means a flow of packets. The term support node refers to both "GGSN" and "SGSN" nodes. The term "user" refers to any person or customer such as a business or organization that employs a mobile device to communicate or access resources over a mobile network. The term "operator" refers to any technician or organization that maintains or services an IP based network. The term "identifier" includes an MSISDN number, an IP address, or any other information that relates to the location or identity of the user. Referring to the drawings, like numbers indicate like parts throughout the views. Additionally, a reference to the singular includes a reference to the plural unless otherwise stated or is inconsistent with the disclosure herein.

Briefly described, the present invention is directed at providing a multimode buffering and scheduling system for a DiffServ router that can be adjusted to show either "pure" AF/EF behavior, "pure" DSUI behavior, or a combination of the AF/EF behavior and the DSUI behavior. An operation point parameter may be set to select the desired behavior.

Illustrative Operating Environment

With reference to FIG. 1, an exemplary mobile IP network in which the invention may operate is illustrated. As shown in the figure, mobile IP network 100 includes mobile station (MN) 105, radio access network (RAN) 110, SGSN 115, core network 120, routers $125_{A-F}$, policy server 190, GGSNs $135_{A-B}$, data network 140, and data network 145.

The connections and operation for mobile IP network 100 will now be described. MN 105 is coupled to radio access network (RAN) 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MS 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. According to one embodiment of the invention, routers $125_{A-C}$ are DiffServ routers that may be adjusted to show either Assured Forwarding (AF)/Expedited Forwarding (EF) behavior, DiffServ Urgency Importance (DSUI) behavior, or a smooth combination of the AF/EF behavior and the DSUI behavior. When deciding the acceptance of a packet, an operation point parameter may be set to indicate how much the occupancy level of the single buffer (AF behavior) versus the occupancy level of all the buffers (DSUI behavior) is taken into account. The link bandwidth may be divided between strict priority scheduling and weight scheduling by setting a link smoothing parameter to indicate how much of the link bandwidth is effectively used for sending packets in strict priority order and how much is left for weight based scheduling. Packets are processed according to how the operation point parameter and the link smoothing parameter are set. These parameters may be set automatically or they may be set by an operator. Policy server 190, or some other dedicated network element, may be used to provide Quality of Service (QoS) rules relating to how the routers process the packets. Briefly described, policy server 190 may be used to monitor and aid in providing the appropriate behavior model for packet processing within the routers for IP based networks. According to one embodiment, each router may inform the policy server of information relating to its operation and receive information from the policy server to set the parameters appropriately.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, policy server 190 communicates with RAN 110 and core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units. According to one embodiment of the invention, routers $125_{D-F}$, as $125_{A-C}$ are DiffServ routers that may be adjusted to show Assured Forwarding (AF)/Expedited Forwarding (EF) behavior, DiffServ Urgency Importance (DSUI) behavior, or a smooth combination of the AF/EF behavior and the DSUI behavior.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MS 105 to access network 140 and network 145.

The operator may set QoS rules to determine whether or not to accept a packet based on different service classes for a particular user or group of users. For example, conversational traffic from user group A may be carried using standard AF/EF behavior, whereas conversational traffic from user group B may be carried with DSUI behavior. The specific user of MN 105 may be differentiated into one of these user groups by an identifier associated with the user. For example, the identifier may be the user Mobile Station Integrated Services Digital Network (MSISDN) number that is known to both the SGSN and the GGSN support nodes.

Policy server 190 is coupled to core network 120 through communication mediums. Policy server 190 may be programmed by an operator with rules to manage the 3GPP quality-of-service (QoS) to IP QoS mapping for mobile IP network 100. More specifically, an operator may generate the rules that are used by the nodes on mobile IP network 100 to help ensure end-to-end QoS. These rules may be supplied to the nodes by policy server 190. Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
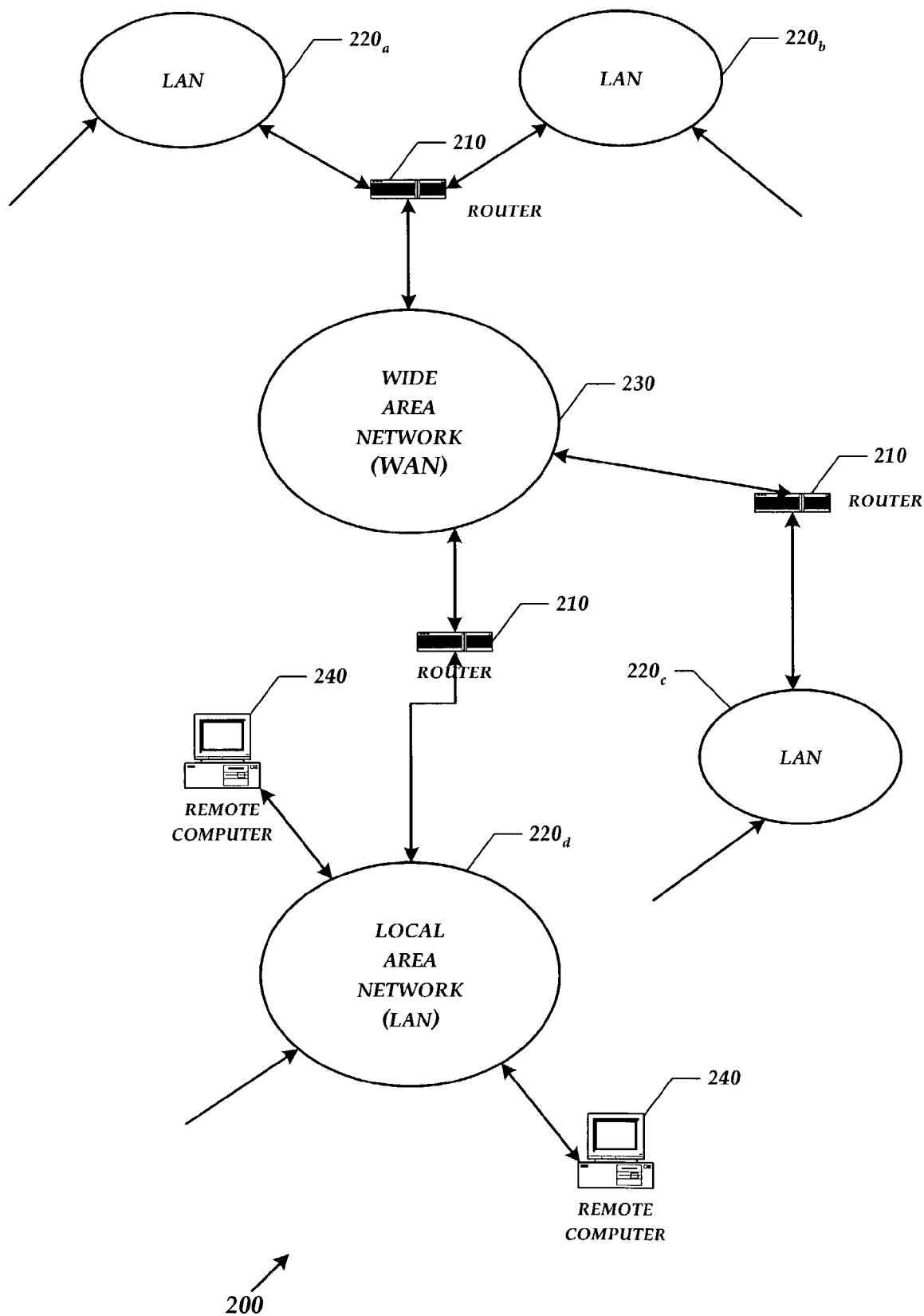
FIG. 2 shows a schematic diagram that illustrates an exemplary system overview in which local area networks and a wide area network are interconnected by routers.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Routers 210 are configured such that an operation point parameter may be set to select the behavior of the router. According to one embodiment of the invention, routers 210 are DiffServ routers that may be adjusted to show either Assured Forwarding (AF)/Expedited Forwarding (EF) behavior, DiffServ Urgency Importance (DSUI) behavior, or a combination of the AF/EF behavior and the DSUI behavior.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Multimode Queuing System for DiffServ Routers

Figure 3:
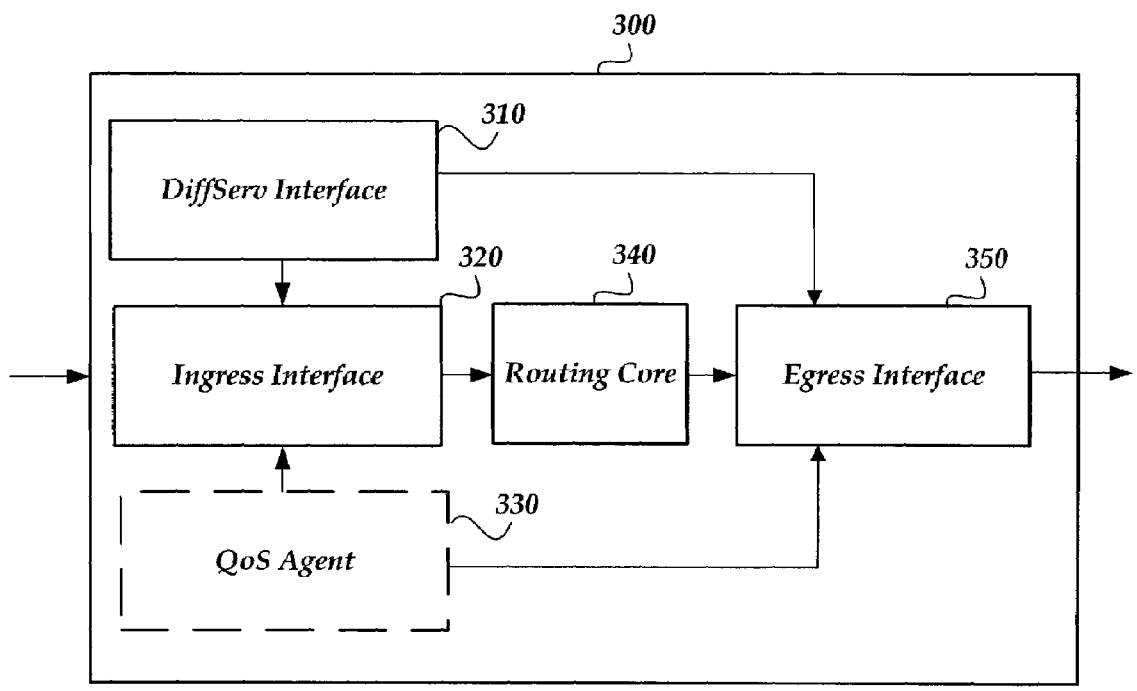
FIG. 3 illustrates an overview block diagram of a DiffServ router.

FIG. 3 illustrates a block diagram of an exemplary DiffServ router in accordance with aspects of the invention. As shown in the figure, DiffServ router 300 includes DiffServ interface 310, ingress interface 320, QoS agent 330, routing core 340, and egress interface 350. DiffServ router 300 may include many more components than those shown in FIG. 3. However, the components shown are sufficient to disclose an illustrative embodiment for practicing the present invention.

As illustrated in FIG. 3, DiffServ router 300 is divided into five functional blocks. Routing core 340 provides a router's normal routing and switching functionality. One of the functionalities of the routing core is to select the egress interface for data packets entering through the ingress interface. The routing core moves packets between interfaces according to set policies. For purposes of this discussion, routing core 340 can be thought of as an infinite bandwidth, zero-delay back-plane connecting interfaces.

DiffServ interface 310 monitors and provisions DiffServ operating parameters relating to the multimode queuing system. Monitored parameters may include statistics regarding traffic carried at various DiffServ service levels. These statistics may be used for accounting purposes and/or for tracking compliance to Traffic Conditioning Specifications (TCSs) negotiated with customers. Provisioned parameters are primarily the TCS parameters for Classifiers and Meters and the associated per-hop behavior (PHB) configuration parameters for actions and queuing elements. The operator, typically through a system administrator, interacts with DiffServ interface 310 through one or more management protocols, such as SNMP or COPS protocol, or through other router configuration tools. The operator may interact with DiffServ interface 310 through a policy server, a serial terminal, a telnet console, and the like.

Specific policy rules and goals governing the DiffServ behavior of a router are typically installed by policy management mechanisms. However, some DiffServ routers may be limited to the kinds of policies which can be successfully implemented by the router. For example, some DiffServ routers within an operator's network may not be able to implement DSUI behavior.

Ingress interface 320, routing core 340 and egress interface 350 are illustrated at the center of the diagram illustrating router 300. In actual router implementations, there may be any number of ingress and egress interfaces interconnected by the routing core. The routing core element serves as an abstraction of a router's normal routing and switching functionality.

Optional QoS block 330 may be used to help enforce QoS requirements. DiffServ router 300 may snoop or participate in either per-microflow or per-flow-aggregate signaling of QoS requirements, e.g. using the RSVP protocol. Snooping of RSVP messages may be used, for example, to learn how to classify traffic without actually participating as a RSVP protocol peer. DiffServ router 300 may reject or admit RSVP reservation requests to provide a means of admission control to Diffserv-based services or it may use these requests to trigger provisioning changes for a flow-aggregation in the DiffServ network. If QoS block 330 is included in DiffServ router 300, it may only be active in the control plane and not in the data plane. In this case, RSVP could be used merely to signal a reservation state without installing any actual reservations in the data plane of DiffServ router 300. The data plane could still act purely on DiffServ DSCPs and provide PHBs for handling data traffic without the normal per-microflow handling expected to support some services.

Ingress interface 320 provides classification, metering, action, and queuing elements. Classifiers are parameterized by filters and output streams. Packets from the input stream are sorted into various output streams by filters which match the contents of the packet or possibly match other attributes associated with the packet. The simplest classifier element is one that matches all packets that are applied at its input. In this case, the classifier may be omitted. A classifier may also classify the input streams according to their service class.

Ingress interface 320 may be configured to identify traffic into classes, meter it, and ensure that any excess traffic is appropriately dealt with according to the PHB. For example, for AF behavior, this may mean marking excess traffic; for EF, this may mean dropping excess traffic or shaping it to a maximum rate.

A packet arriving at ingress interface 320 picks up its policy from a classifier, which selects traffic according to some specification for each traffic class. Typically, a classifier identifies a variety of traffic and breaks it up into separate classes. According to one embodiment of the invention, packets are classified according to an importance priority and an urgency priority. More priorities may be implemented.

For network planning and perhaps other business purposes, such as for billing purposes, arriving traffic is normally counted. Therefore, a count action is configured. Also, traffic may be marked or remarked with the appropriate DSCP by a mark action. The operator may select the importance and urgency levels according to their business model. For instance, if the operator desires to maximize instant revenues, importance should have a direct relationship to the financial benefit of the packet to the network operator. When the objective of the operator is to support the primary business of the enterprise, preference could be given to those applications that are important to reach that objective.

Marking of the packet priorities is typically done in the first node that is controlled by the network operator. The packet typically does not need further marking by any of the other nodes. According to another embodiment of the invention, marking of the packet may be done in the mobile node. Under this scenario, a confidential relationship between the user and the operator is established. Packets may also be re-marked. For instance, the packets may be re-classified at the boundaries between network domains.

A metering element may be used to determine whether the stream is within a predetermined rate by monitoring real-time traffic conditions. As a result of the information obtained by the metering element actions may be triggered within the DiffServ router. For example, a metering element may be used to determine when the customer is being served according to their service level agreement (SLA). A meter measures the rate at which packets making up a stream or flow of traffic pass it, compares the measured rate to some set of thresholds and produces some number of potential results. A packet is said to conform to a specified level if, at the time that the packet is being examined, the stream appears to be within the rate limit for the profile associated with that level.

An action element sets the action to be applied to the packet. For example, the action element may mark a packet, drop a packet according to the classification and queue in question, multiplex, count, or perform a null action. Actions are events in a DiffServ interface that may affect the packet. An action may calculate statistics on traffic in various configured classes, mark it with a DSCP, drop it, or queue it before passing it on for other processing.

DiffServ codepoint (DSCP) Markers are elements which set a codepoint (e.g. the DSCP in an IP header). The DSCP markings are typically applied either by a trusted upstream node, e.g. a customer, or by the edge routers on entry to the DiffServ network. DSCP Markers may also act on unmarked packets (e.g. those submitted with DSCP of zero) or may re-mark previously marked packets. The mark set in a packet will determine its subsequent PHB treatment in downstream nodes of a network and possibly also in subsequent processing stages within DiffServ router 400. DSCP Markers for DiffServ are normally parameterized by a single parameter: the 6-bit DSCP to be marked in the packet header.

Egress interface 350 is arranged to receive data from DiffServ interface 310, routing core 340, and QoS block 330. Egress interface 350 also includes an output for outputting packets using the appropriate behavior that is selected according to the operation point parameter. As mentioned above, many actions may be applied to the packets.

Queuing elements modulate the transmission of packets belonging to the different traffic streams and determine their ordering, possibly storing them temporarily or discarding them. Packets are usually stored either because there is a resource constraint (e.g., available bandwidth) which prevents immediate forwarding, or because the queuing block is being used to alter the temporal properties of a traffic stream (i.e. shaping). However, when several queues are used together in a queuing system, they can also achieve effects beyond that for given traffic streams. They can be used to limit variation in delay or impose a maximum rate (shaping), to permit several streams to share a link in a semi-predictable fashion (load sharing), or to move variation in delay from some streams to other streams. The queuing elements in router 300 may be used to implement AF/EF behavior, DSUI behavior, or a combination of the behaviors.

A scheduler is an element which gates the departure of each packet that arrives at one of its inputs, based on a service discipline. The scheduler typically has one or more inputs and one output. Each input has an upstream element to which it is connected, and a set of parameters that affects the scheduling of packets received at that input. The scheduler may utilize a variety of scheduling algorithms, including, but not limited to, first come first served, strict priority, weighted fair bandwidth sharing, rate-limited strict priority and rate-based. Schedulers may be used to shape traffic streams to match some profile by delaying packets that might be deemed non-conforming by some downstream node: a packet is delayed until such time as it would conform to a downstream meter using the same profile. PHBs, such as the class selectors, AF/EF, or DSUI have descriptions or configuration parameters which strongly suggest the sort of scheduling discipline needed to implement them.

Figure 4:
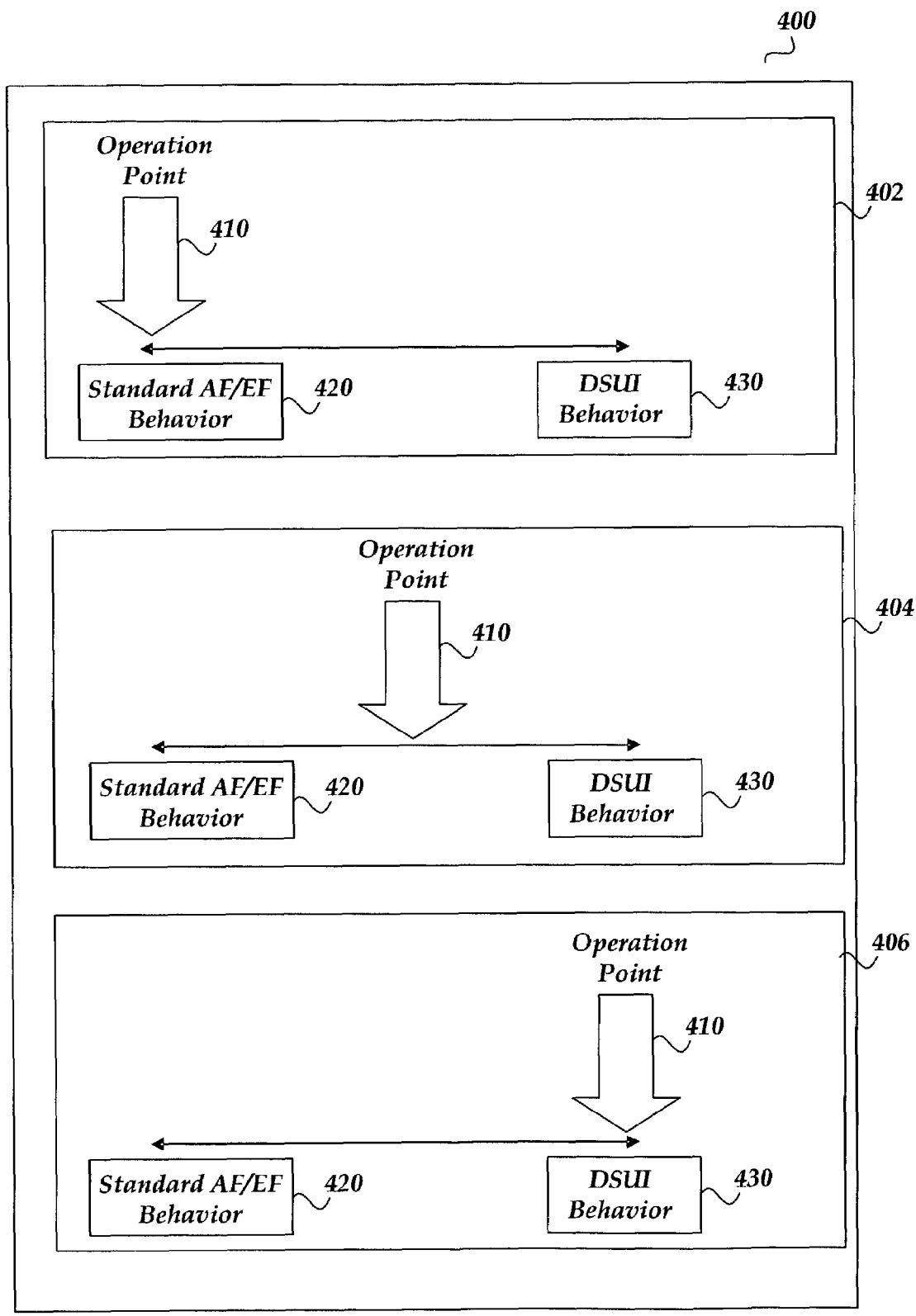
FIG. 4 shows selection of the behaviour for a multimode queuing system for DiffServ routers.

FIG. 4 shows selection of the behaviour for a multimode queuing system for DiffServ routers, in accordance with aspects of the invention. As shown in the figure, DiffServ multimode queuing selection system 400 includes operation point 410, standard AF/EF behaviour 420, and DSUI behaviour 430 illustrated in panels 402, 404, and 406.

Operation point 410 may be adjusted to select the desired operation of the DiffServ router. For example, an operator may set operation point 410 to configure a DiffServ router. Panel 402 illustrates the operation of the DiffServ router to show purely AF/EF behaviour. As can be seen by referring to panel 402, operation point 410 is directly over standard AF/EF behaviour 420.

Panel 404 illustrates the operation of the DiffServ router to be a combination of standard AF/EF behaviour and DSUI behaviour. As shown in panel 404, operation point 410 has been set, and is located, between standard AF/EF behaviour 420 and DSUI behaviour 430.

Panel 406 illustrates the operation of the DiffServ router to be fully DSUI compatible. As shown in panel 406, operation point 410 is directly over DSUI behaviour 430.

An advantage of this approach is that the same hardware and/or software implementation can support both standard AF/EF behaviour and DSUI behaviour with very small additional cost and effort. Additionally, the management of the behaviour of the DiffServ router may be set using a single operation point parameter. As such, there is no need for several parallel queuing systems (e.g. one queuing system for AF/EF behaviour, and one queuing system for DSUI behaviour).

Figure 5:
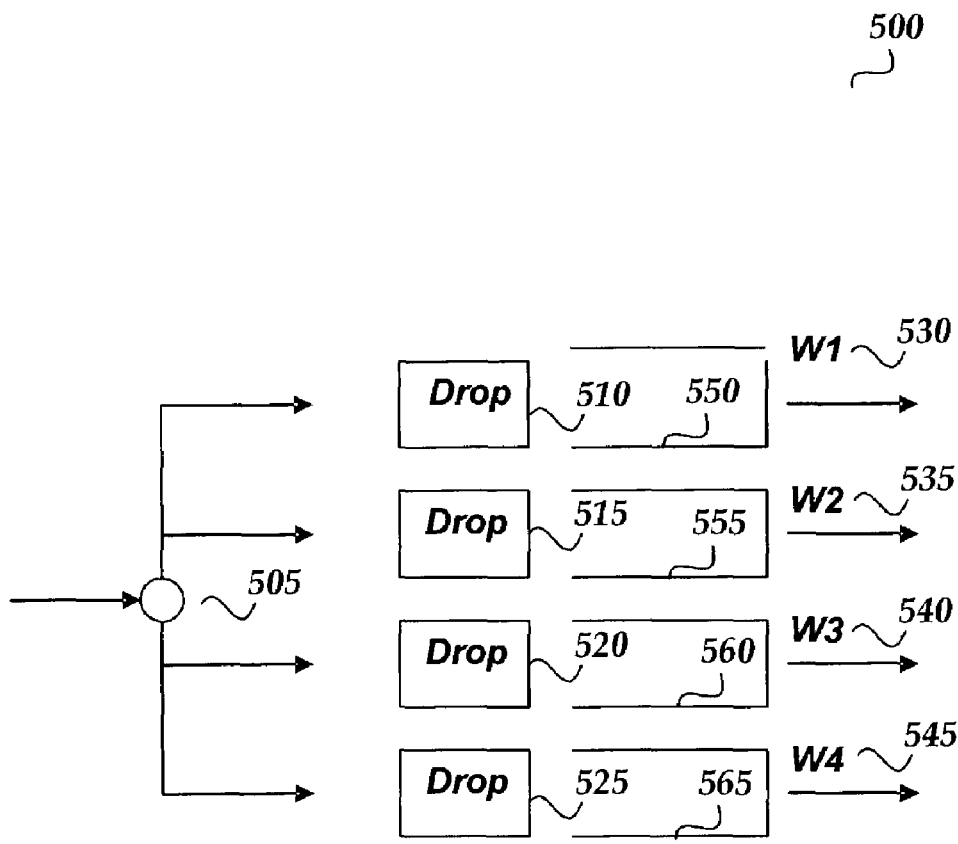
FIG. 5 shows an Assured Forwarding system utilizing a weighting system.

FIG. 5 shows an Assured Forwarding system utilizing a weighting system. As shown in the figure, AF system 500 includes input 505, drop block 510, drop block 515, drop block 520, drop block 525, queue 550, queue 555, queue 560, queue 565, weighting parameter W1 530, weighting parameter W2 535, weighting parameter W3 540, and weighting parameter W4 545.

In Assured Forwarding (AF) the network provides four separate traffic classes each with three drop precedence (DP) levels. Each traffic class is allocated a certain amount of resources. The resources may include bandwidth and buffering capacity. One exemplary way to provide the four separate traffic classes is to implement four separate queues that are served according to a weighting parameter that is associated with its respective queue. The queues may be scheduled many different ways. For example, a weighted round robin method serves each of the four queues one by one and the weight determines the number of bytes that are served in each queue during its turn.

As can be seen by referring to FIG. 5, four separate queues (queue 550, queue 555, queue 560, and queue 565) are provided to implement the AF behavior. Each queue has an associated weighting parameter (W1 530, W2 535, W3 540, and W4 545). The weighting parameters are used to imply the amount of forwarding resources that the queue is served with. For more than four traffic classes, a separate weighting parameter may be applied to each queue. For example, for N queues, $Q_{i-N}$, the weighting parameters may be defined by $W_i$ where i=1 to N.

While the end-to-end QoS relates to the weights associated with the queues, controlling the weights alone does not mean that the service offered by one class will be better than another class. The overall end-to-end QoS depends heavily on the incoming traffic of the classes. Therefore, even if class 1 has a larger weight than class 2, the service offered by class 1 may not be any better than the service offered by class 2. In addition to the weighting parameters for each queue, the AF classes can be used to realize three different dimensions of service differentiation, including: drop probability, delay, and available bandwidth. As a result, it is evident that the controlling algorithm of weights is an intricate issue in real networks and can lead to totally different services in two systems compliant with an AF specification.

In addition to the use of weights another basic aspect of the typical AF implementation is that packets are dropped (discarded) per queue if congestion occurs. Typically the packet drop decision is made only based on the congestion of that particular queue that the packet is going to use. Drop boxes 510, 515, 520, and 525 are configured to drop the packets based on congestion of its associated queue. This also implies one essential characteristics feature: the queue to be used for buffering the packet is selected first; the decision about packet drop is made only after this as the second step. While one exemplary AF system has been shown other implementations of AF may be used within a DiffServ router.

Figure 6:
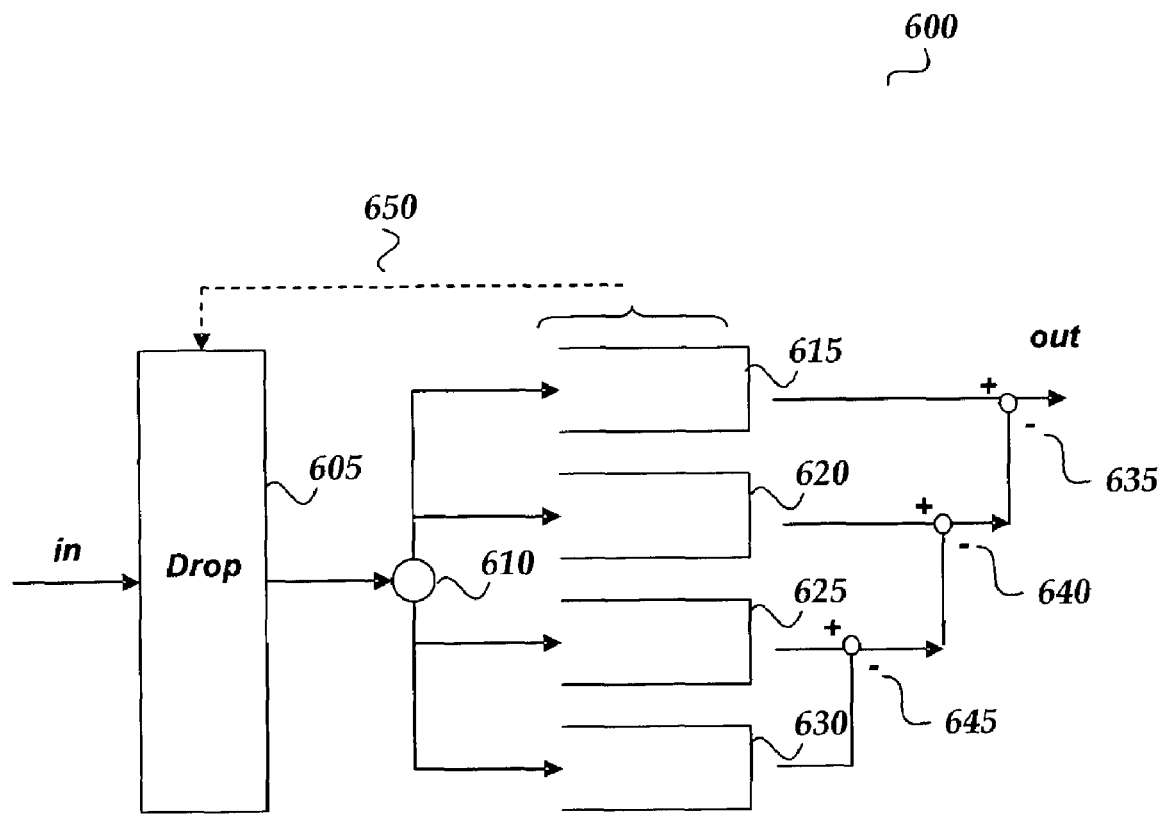
FIG. 6 illustrates a DSUI behaviour system that may be configured to implement AF/EF behaviour and a combination of the behaviours.

FIG. 6 illustrates a DSUI behaviour system that may be configured to implement AF/EF behaviour and a combination of the behaviours, in accordance with aspects of the invention. As shown in the figure, system 600 includes drop block 605, ingress interface 610, queue 615, queue 620, queue 625, queue 630, operator 635, operator 640, operator 645, and feedback path 650.

The main principle of the DiffServ Urgency Importance (DSUI) model is to clearly separate three dimensions of differentiation, including delay differentiation, drop differentiation, and bandwidth differentiation. Generally, delay differentiation is achieved by using separate queues, where the number of delay classes is equivalent to the number of parallel queues. Drop differentiation is achieved either through software or hardware placed before the buffering unit in a way that drop probability of a packet does not depend on the delay class of the packet. Bandwidth differentiation between individual flows is achieved through means of appropriate traffic control at the edge of the network.

Basically, DSUI can be considered as a general framework that is in compliance with the above principles. In that respect, DSUI does not dictate any specific system, and the AF PHB model may be used in a way that it conforms to the DSUI principles.

One of the features of a typical DSUI implementation is that the decision to drop a packet is made before the decision of which queue to place the packet. Typically in DSUI, the drop decision is not based on the congestion of a queue but rather on the congestion of the output link. The drop decision is made based on the occupancy levels of all the queues, or some other factor that reliably depicts the congestion level of the output link. For example, it may be enough just to take into account a number of queues but not every queue. Typically DSUI implementations have utilized strict priority queuing between the different queues. For example, the highest priority queue is served first, and only when there is nothing to be sent in that queue the next queue is served. This process continues until all of the queues have been served. Feedback path 650, indicates feedback relating to the congestion level of all the queues (queue 615, queue 620, queue 625, and queue 630).

One advantage of the DSUI model is that it provides a clearer framework to assess service differentiation and QoS than DiffServ using only AF/EF specifications. Although an AF/EF system may be presumably implemented on the packet handling level, the AF/EF system contains serious difficulties related to the management of services and controlling of weights. The difficulty results mainly because one factor (weighting parameters) is supposed to control three different features of packet transport (transfer delay, packet drop and bandwidth) at the same time. On the other hand, the DSUI is currently a non-standardized solution. Thus, there is a need for a solution so that a Diffserv router may be configured to implement AF/EF behaviour, DSUI behaviour, or a combination of the behaviours by setting an operation point parameter. This solution takes into account both the packet drop and scheduling aspects. The packet drop aspect is handled through the operation point parameter that is selected such that it indicates how much the occupancy level of the single buffer (AF behaviour) vs. the occupancy level of all the buffers (DSUI behaviour) is taken into account when deciding about the acceptance of the packet. The scheduling behavior aspect is taken care of by dividing the link bandwidth to "strict priority scheduling" part and to "weight scheduling" part and using a link smoothing parameter to indicate, how much of the link bandwidth is effectively used for sending packets in strict priority order and how much is left for weight based scheduling.

In the basic DSUI model the packet discarding decision is based on the total load situation serving one outgoing link, whereas AF packet discarding is based on the load situation in the queue which the packet is to be placed. In the AF model, each queue has its own weight that defines the resources given to the class, whereas in the basic DSUI model queues are served in strict priority order.

The first aspect related to packet discarding can be realized by means of an extension to the DSUI model. The packet discarding is based on the maximum load among all queues in a way that the required importance level of a packet belonging to class i ($I_{req,i}$) is described by Equation 1 and Equation 2.

$$I_{req,i}(DSUI) = f\left(\frac{x_1}{B_1}, \frac{x_2}{B_2}, \ldots, \frac{x_N}{B_N}\right) \quad \text{Equation 1}$$

for instance $$I_{req,i}(DSUI) = \max\left[0, a + b \cdot \max\left(\frac{x_1}{B_1}, \frac{x_2}{B_2}, \ldots, \frac{x_N}{B_N}\right)\right] \quad \text{Equation 2}$$

where $x_i$ is the occupancy level of buffer i (measured for example in number of bytes); $B_i$ is the total buffer size of class I; and a and b are constants.

In the case of AF or similar system the required importance level is, correspondingly given by Equation 3.

$$I_{req,i}(AF) = f\left(\frac{x_i}{B_i}\right) \quad \text{EQUATION 3}$$

These two approaches are combined so that the required importance level for accepting the packet is a combination of the two functions for AF and for DSUI, which is given by EQUATION 4.

$$I = g(I_{req,i}(AF), I_{req,i}(DSUI)) \quad \text{EQUATION 4}$$

An exemplary smoothing equation is provided in EQUATION 5.

$$I = \alpha \cdot I_{req,i}(AF) + (1-\alpha) \cdot I_{req,i}(DSUI) \quad \text{EQUATION 5}$$

where $\alpha$ is the operation point parameter that determines the percentage of AF behaviour and DSUI behaviour is provided by the DiffServ router.

The model may be further configured such that the probability of discarding a packet is not either 0% or 100%, but it also may also be a percentage between 0% and 100% depending on the load situation. With respect to the AF model, this means that the Random Early Detection (RED) is applied to the queue relating to each class. The same principle can be used with DSUI model as well.

The weights versus strict priority scheduling of buffer may also be combined. EQUATION 6 is an exemplary equation illustrating combining weights versus strict priority scheduling.

$$w_i = r(\beta, w_{i,AF}, w_{i,DSUI}) \quad \text{EQUATION 6}$$

where r is a function that combines weights $w_{i,AF}$ and $w_{i,DSUI}$ and $\beta$ is a parameter that determines the weight between the AF and DSUI behaviour. For example, $\ln(w_i) = \beta \cdot \ln(w_{i,AF}) + (1-\beta) \cdot \ln(w_{i,DSUI})$ where, for instance, $w_{i,DSUI} = d^{-i}$ and d is a large enough constant to guarantee nearly strict priority ordering.

Referring to the previous equation, when $\beta=1$, the DiffServ router acts as a pure AF system and with $\beta=0$ the DiffServ router acts as a pure DSUI system.

The DSUI model allows a flexible and scalable way to provide quality differentiation in a quickly changing environment. With the DSUI model, the operator only needs to map services at the edge of network in a way that when load situation or traffic pattern of a service class changes, no changes to the core network are needed. Therefore, the main task for the operator is to manage the differentiation rules, and as the rules likely are quite permanent, the management remains simple.

One advantage of the DSUI model is that DSUI principles can be used in multi-vendor environment in which different routers have different capabilities. In DSUI the classes are unambiguously defined as delay classes, and DSUI importance levels have universal meaning over all traffic classes. DSUI is one framework that still offers considerable freedom to apply different business models and service rules.

One difference between DSUI and other frameworks is that a high importance of an application does not directly result in high importance of packets. If an application of high importance, that is, it has a high utility, has a high bit rate requirement as well, it is not evident that individual packets of the application should be ranked as important. For example, assume the utility of a voice call is defined as level 100 and assume that the utility of a videoconference (per minute) is 2000. Now if the bit rate requirement for voice call is 10 kbps and for video conference 500 kbps, the importance of a video byte is obviously smaller than that of a voice byte. With a streaming video example, the result is even more compelling. Video packets cannot be as important as voice packets, and actually, the difference may be very large.

Therefore, it is not enough to define the importance of an application, but there must be some kind of relationship between the bit rate used by the flow and the importance marking. The simplest scheme is just to have one threshold. When the momentary bit rate is below the threshold, the importance of the packet is constant. Whereas when the momentary bit rate is above the threshold, the importance is the lowest possible and the network is allowed to discard those packets immediately. If this kind of approach is used, it is basically possible to have a direct relationship between the importance of flow and the importance of a packet.

Figure 7:
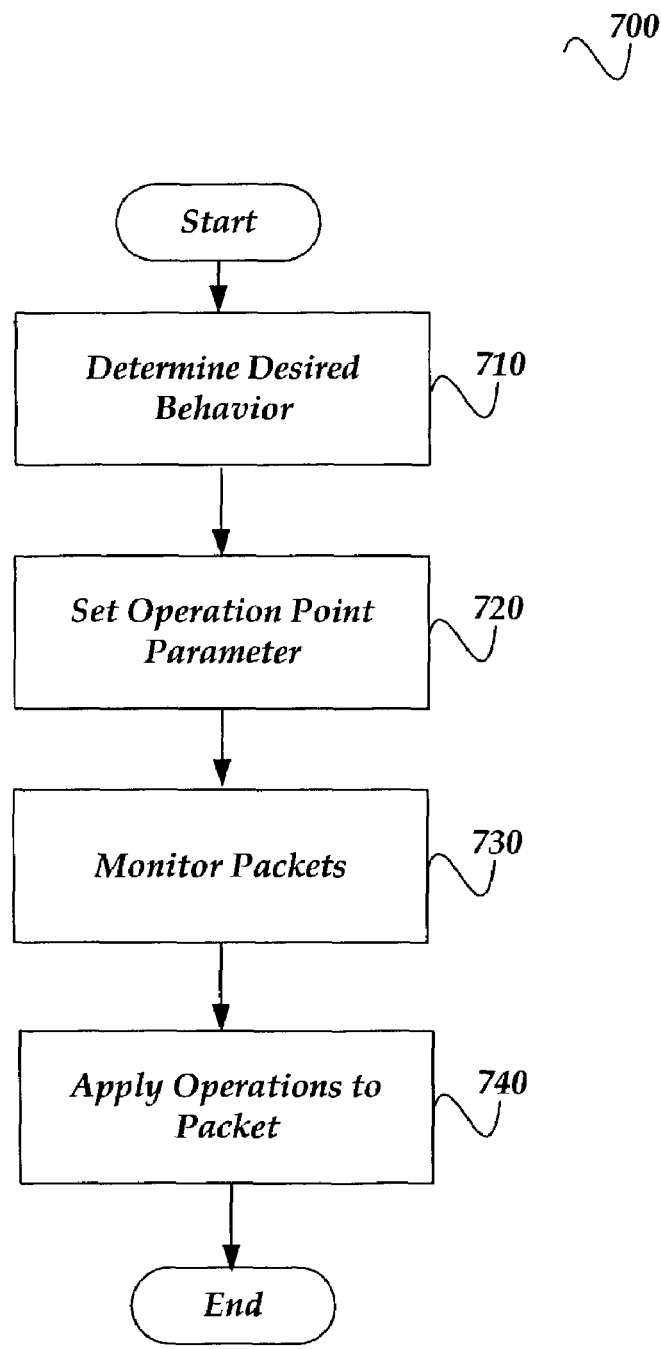
FIG. 7 illustrates a process for providing a multimode queuing system for DiffServ routers, in accordance with aspects of the invention.

FIG. 7 illustrates a process for providing a multimode queuing system for DiffServ routers, in accordance with aspects of the present invention. After a start block, the process flows to block 710, where the desired behavior for the DiffServ router is determined. The behavior may be selected to be AF/EF behavior, DSUI behavior, or a combination of the behaviors. Transitioning to block 720, the operation point parameter is set. The operation point parameter may be set such that the DiffServ router provides pure AF/EF behavior, pure DSUI behavior, or a combination of both. The operation point may be set manually or automatically. For example, an operator may individually configure each DiffServ router, or the operator may configure a policy server to broadcast the operation point parameter to the nodes on the network. Moving to block 730, the process monitors the incoming packets. Flowing to block 740, the operations to implement the desired behavior on the router is applied to the packets. The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for selecting the behavior for a multimode queuing system for a DiffServ router, comprising:
    determining a desired behavior relating to an Assured Forwarding/Expedited Forwarding (AF/EF) behavior and a DiffServe Urgency Importance (DSUI) behavior;
    selecting the desired behavior, wherein the desired behavior is selected from the AF/EF behavior, or the DSUI behavior, or a combination of the AF/EF behavior, and the DSUI behavior, and wherein selecting the desired behavior, comprises setting an operation point parameter to select one of pure AF/EF behavior, pure DSUI behavior, or a smooth combination of AF/EF behavior and DSUI behavior, and wherein according to DSUI behavior a drop probability does not depend on a delay class of a packet and queues are served according to strict priority queuing between the queues;
and performing the desired behavior;
wherein the desired behavior comprises serving queues of the DiffServ router based on a combination of weighted priority scheduling and strict priority scheduling,
wherein for each of the queues the combination comprises a weighted sum of a first number and a second number,
wherein a second operation parameter specifies relative weights of the first and second numbers in the sum,
wherein the first number represents a number of bytes in the queue to be served during a turn of the queue in a weighted round robin implementation of Assured Forwarding, and
wherein the second number indicates a number of bytes that is large enough to guarantee nearly strict priority ordering of the queues if the combination consisted only of the second number.

2. The method of claim 1, wherein performing the desired behavior further comprises monitoring packets and applying operations to the packets to perform the desired behavior.

3. A system for a multimode queuing system for DiffServ routers, comprising:
nodes, wherein the nodes include a network interface unit arranged to communicate packets across the network; and
a DiffServ router; wherein the DiffServ router includes: a network interface unit arranged to receive the packets and transmit packets to the nodes; an operation point parameter that indicates a behavior of the DiffServ router, wherein the behavior relates to an Assured Forwarding/Expedited Forwarding (AF/EF) behavior and a DiffServe Urgency Importance (DSUI) behavior, wherein the operation point parameter is set to select a combination of the AF/EF behavior and the DSUI behavior, and wherein according to DSUI behavior a drop probability does not depend on a delay class of a packet and queues are served according to strict priority queuing between the queues; and
wherein the DiffServ router comprises queues and is configured to serve the queues based on a combination of weighted priority scheduling and strict priority scheduling,
wherein for each of the queues the combination comprises a weighted sum of a first number and a second number,
wherein a second operation parameter specifies relative weights of the first and second numbers in the sum,
wherein the first number represents a number of bytes in the queue to be served during a turn of the queue in a weighted round robin implantation of Assured Forwarding, and
wherein the second number indicates a number of bytes that is large enough to guarantee nearly strict priority ordering of the queues if the combination consisted only of the second number.

4. The system of claim 3, wherein the operation point parameter may be set to show pure AF/EF behavior.

5. The system of claim 3, wherein the operation point parameter may be set to show pure DSUI behavior.

6. The system of claim 5, wherein the operation point parameter relates to an occupancy level of a single buffer from a group of buffers versus another occupancy level of the group of buffers.

7. The system of claim 5, further comprising a policy server that includes: a processor and a computer-readable medium; a network interface unit arranged to communicate with the DiffServ router, and a QOS program operative to perform actions including: determining the behavior of the DiffServ router; and communicating the behavior to the DiffServ router.

8. The system of claim 7, wherein communicating the behavior to the DiffServ router is done automatically.

9. An apparatus for a multimode queuing system, comprising:
a network interface unit arranged to communicate with nodes on a network and arranged to receive packets;
queues that are coupled to the network interface unit;
a multimode queuing block coupled to the queues and the network interface unit, wherein the multimode queuing block provides Assured Forwarding/Expedited Forwarding (AF/EF) behavior and DiffServe Urgency Importance (DSUI) behavior; and
an operation point parameter that selects a combination of the AF/EF behavior and the DSUI behavior, wherein the selected combination is one of pure AF/EF behavior, pure DSUI behavior, or a combination of the AF/EF behavior and the DSUI behavior, wherein according to DSUI behavior a drop probability does not depend on a delay class of a packet and queues are served according to strict priority queuing between the queues;
wherein the multimode queuing block is configured to serve the queues based on a combination of weighted priority scheduling and strict priority scheduling,
wherein for each of the queues the combination comprises a weighted sum of a first number and a second number,
wherein a second operation parameter specifies relative weights of the first and second numbers in the sum,
wherein the first number represents a number of bytes in the queue to be served during a turn of the queue in a weighted round robin implantation of Assured Forwarding, and
wherein the second number indicates a number of bytes that is large enough to guarantee nearly strict priority ordering of the queues if the combination consisted only of the second number.

10. The apparatus of claim 9, further comprising a smoothing parameter that indicates how much of a link bandwidth is divided between strict priority order and weight based scheduling.

11. The apparatus of claim 9, further comprising a QoS block coupled to the multimode queuing block and configured to help enforce QoS requirements.

12. An apparatus for a multimode queuing system, comprising:
a means for determining a desired behavior, wherein the desired behavior relates to an Assured Forwarding/Expedited Forwarding (AF/EF) behavior and a DiffServe Urgency Importance (DSUI) behavior, wherein according to DSUI behavior a drop probability does not depend on a delay class of a packet and queues are served according to strict priority queuing between the queues;
a means for selecting the desired behavior, wherein the desired behavior is selected from the AF/EF behavior, or the DSUI behavior, or a combination of the AF/EF behavior and the DSUI behavior;
a means to make a packet drop decision based on a combination of a load level of a destination queue and on a load level relating to a set of queues or all queues;
a means for performing the desired behavior; and
means for scheduling based on a combination of weighted priority scheduling and strict priority scheduling, wherein for each of the queues the combination comprises a weighted sum of a first number and a second number,
wherein a second operation parameter specifies relative weights of the first and second numbers in the sum,
wherein the first number represents a number of bytes in the queue to be served during a turn of the ciueue in a weighted round robin implantation of Assured Forwarding, and
wherein the second number indicates a number of bytes that is large enough to guarantee nearly strict priority ordering of the queues if the combination consisted only of the second number.

13. An apparatus of claim 12 that further comprises a means to share a link transport capacity between queues according to weights assigned for each queue.

14. An apparatus of claim 12 that further comprises a means to share a link transport capacity between queues according to a strict priority order between the queues.

15. An apparatus of claim 12 that further comprises a means to share a link transport capacity between queues based on a combination of the weights assigned for each queue and on a strict priority order between the queues.

16. A method for selecting the behavior for a multimode queuing system for a DiffServ router, comprising:
determining a desired behavior relating to an Assured Forwarding/Expedited Forwarding (AF/EF) behavior and a DiffServe Urgency Importance (DSUI) behavior;
selecting the desired behavior, wherein the desired behavior is selected from the AF/EF behavior, or the DSUI behavior, or a combination of the AF/EF behavior and the DSUI behavior, and wherein selecting the desired behavior comprises setting an operation point parameter to select one of pure AF/EF behavior, pure DSUI behavior, or a smooth combination of AF/EF behavior and DSUI behavior, and wherein according to DSUI behavior a drop probability does not depend on a delay class of a packet and queues are served according to strict priority queuing between the queues;
and performing the desired behavior for a multimode queuing system for a DissServ router;
wherein the desired behavior comprises dropping a packet having an importance level less than a required importance level,
wherein the required importance level is a weighted sum of a first function and a second function, wherein the first function is a function of a maximum of ratios of occupancy to buffer size of the group of buffers,
wherein the second function is a function of a ratio of occupancy to buffer size of the single buffer and the single buffer has a class corresponding to a class of the packet, and
wherein the operation point parameter specifies the weight of the first function with respect to the second function in the weighted sum.

17. A system for a multimode queuing system for DiffServ routers, comprising:
nodes, wherein the nodes include a network interface unit arranged to communicate packets across the network; and
a DiffServ router; wherein the DiffServ router includes: a network interface unit arranged to receive the packets and transmit packets to the nodes; and an operation point parameter that indicates a behavior of the DiffServ router, wherein the behavior relates to an Assured Forwarding/Expedited Forwarding (AF/EF) behavior and a DiffServe Urgency Importance (DSUI) behavior, wherein the operation point parameter is set to select a combination of the AF/EF behavior and the DSUI behavior, and wherein according to DSUI behavior a drop probability does not depend on a delay class of a packet and queues are served according to strict priority queuing between the queues;
wherein the DiffServ router is configured to drop a packet having an importance level less than a required importance level,
wherein the required importance level is a weighted sum of a first function and a second function,
wherein the first function is a function of a maximum of ratios of occupancy to buffer size of the group of buffers,
wherein the second function is a function of a ratio of occupancy to buffer size of the single buffer and the single buffer has a class corresponding to a class of the packet, and
wherein the operation point parameter specifies the weight of the first function with respect to the second function in the weighted sum.

18. An apparatus for a multimode queuing system, comprising:
a network interface unit arranged to communicate with nodes on a network and arranged to receive packets;
queues that are coupled to the network interface unit;
a multimode queuing block coupled to the queues and the network interface unit, wherein the multimode queuing block provides Assured Forwarding/Expedited Forwarding (AF/EF behavior and DiffServe Urgency Importance (DSUI) behavior; and
an operation point parameter that selects a combination of the AF/EF behavior and the DSUI behavior, wherein the selected combination is one of pure AF/EF behavior, pure DSUI behavior, or a combination of the AF/EF behavior and the DSUI behavior, wherein according to DSUI behavior a drop probability does not depend on a delay class of a packet and queues are served according to strict priority queuing between the queues;
wherein the multimode queuing block is configured to drop a packet having an importance level less than a required importance level,
wherein the required importance level is a weighted sum of a first function and a second function,
wherein the first function is a function of a maximum of ratios of occupancy to buffer size of the group of buffers,
wherein the second function is a function of a ratio of occupancy to buffer size of the single buffer and the single buffer has a class corresponding to a class of the packet, and
wherein the operation point parameter specifies the weight of the first function with respect to the second function in the weighted sum.

19. An apparatus for a multimode queuing system, comprising:
means for determining a desired behavior, wherein the desired behavior relates to an Assured Forwarding/Expedited Forwarding (AF/EF) behavior and a DiffServe Urgency Importance (DSUI) behavior, wherein according to DSUI behavior a drop probability does not depend on a delay class of a packet and queues are served according to strict priority queuing between the queues;
means for selecting the desired behavior, wherein the desired behavior is selected from the AF/EF behavior, or the DSUI behavior, or a combination of the AF/EF behavior and the DSUI behavior;

means for making a packet drop decision based on a combination of a load level of a destination queue and on a load level relating to a set of queues or all queues; and means for performing the desired behavior;

wherein the means for performing the desired behavior is configured to drop a packet having an importance level less than a required importance level, wherein the required importance level is a weighted sum of a first function and a second function, wherein the first function is a function of a maximum of ratios of occupancy to buffer size of the group of buffers, wherein the second function is a function of a ratio of occupancy to buffer size of the single buffer and the single buffer has a class corresponding to a class of the packet, and wherein the operation point parameter specifies the weight of the first function with respect to the second function in the weighted sum.

20. The method of claim 1, wherein the operation point parameter relates to an occupancy level of a single buffer from a group of buffers versus another occupancy level of the group of buffers.

21. The apparatus of claim 9, wherein the operation point parameter relates to an occupancy level of a single buffer from a group of buffers versus another occupancy level of the group of buffers.

* * * * *

UNITED STATES PATENT AND TRADEMARK OFFICE
CERTIFICATE OF CORRECTION

PATENT NO. : 7,283,536 B2
APPLICATION NO. : 10/167769
DATED : October 16, 2007
INVENTOR(S) : Ruutu et al.

It is certified that error appears in the above-identified patent and that said Letters Patent is hereby corrected as shown below:

In column 3, line 17, delete "$125_{A-F}.$" and insert -- $125_{A-F}$, --, therefor.

In column 3, line 18, delete "$135_{A-B}.$" and insert -- $135_{A-B}$, --, therefor.

In column 5, line 62, delete "back-plane" and insert -- backplane --, therefor.

In column 6, line 34, delete "Diffserv-based" and insert -- DiffServ-based --, therefor.

In column 10, line 39, delete "Diffserv" and insert -- DiffServ --, therefor.

In column 11, line 50, delete "$W^{i,DSUI}$" and insert -- $W_{i,DSUI}$ --, therefor.

In column 12, line 63, in Claim 1, delete "behavior," and insert -- behavior-- , therefor.

In column 12, line 65, in Claim 1, delete "behavior," and insert -- behavior --, therefor.

In column 13, line 5, in Claim 1, delete "behavior;" and
insert -- behavior for a multimode queuing system for a DiffServ router; --, therefor.

In column 14, line 2, in Claim 7, delete "QOS" and insert -- QoS --, therefor.

In column 15, line 6, in Claim 12, delete "ciueue" and insert -- queue --, therefor.

In column 15, line 40, in Claim 16, delete "DissServ" and insert -- DiffServ --, therefor.

UNITED STATES PATENT AND TRADEMARK OFFICE
CERTIFICATE OF CORRECTION

PATENT NO. : 7,283,536 B2
APPLICATION NO. : 10/167769
DATED : October 16, 2007
INVENTOR(S) : Ruutu et al.

It is certified that error appears in the above-identified patent and that said Letters Patent is hereby corrected as shown below:

In column 16, line 29, in Claim 18, delete "(AF/EF" and insert -- (AF/EF) --, therefor.

Signed and Sealed this

Eighteenth Day of December, 2007

JON W. DUDAS
*Director of the United States Patent and Trademark Office*